United States Patent [19]

Driscoll et al.

[11] 4,229,090

[45] Oct. 21, 1980

[54] FILM PACK FOR SMALL FORMAT FILM SHEETS

[75] Inventors: John J. Driscoll, Andover; Nicholas Gold, Arlington; Philip R. Norris, North Reading; Richard R. Wareham, Marblehead, all of Mass.

[73] Assignee: Polaroid Corporation, Cambridge, Mass.

[21] Appl. No.: 902,063

[22] Filed: May 2, 1978

[51] Int. Cl.² .................... G03B 17/02; G03B 17/26; G03B 17/52; G03B 19/06
[52] U.S. Cl. ................................ 354/86; 354/159; 354/210; 354/212; 354/276
[58] Field of Search ...................... 354/83–86, 354/159, 210, 212, 174; 74/89.17, 102, 104, 110

[56] References Cited

U.S. PATENT DOCUMENTS

| | | | |
|---|---|---|---|
| 1,799,145 | 4/1931 | Bischof | 74/110 |
| 3,263,511 | 8/1966 | Wellstein | 74/102 |
| 3,709,122 | 1/1973 | Blinow et al. | 354/83 X |
| 3,936,850 | 2/1976 | Goto | 354/212 |

FOREIGN PATENT DOCUMENTS 2355366  5/1974  Fed. Rep. of Germany ............. 354/83

*Primary Examiner*—L. T. Hix
*Assistant Examiner*—Shelley Wade
*Attorney, Agent, or Firm*—Leslie J. Payne

[57] ABSTRACT

A film pack for small format, self-processing film sheet assemblies and by which such film sheet assemblies may be exposed and processed by instant camera designed for larger format, standard film sheets. The small format film pack has the same exterior dimension as the standard film pack but positions the small format sheet properly for exposure in the camera. Movement of a camera carried film pick is transmitted to the reduced format film sheets by a pick relay which may include a mechanism for amplifying the distance of camera pick movement. A mask is provided for the camera viewfinder to correlate the size of a subject image to that of the reduced image format of the film sheets.

13 Claims, 12 Drawing Figures

FILM PACK FOR SMALL FORMAT FILM SHEETS

BACKGROUND OF THE INVENTION

This invention relates to photographic systems and more particularly, it concerns apparatus for accommodating modified format sizes of photographic sheet film in existing camera systems.

In the camera system marketed by Polaroid Corporation under the trademarks, "Polaroid SX-70 Land Camera" and "Polaroid SX-70 Land Film", camera structure and operation are integrated with a container or pack of film in the sense that electric power for camera operation is supplied by a battery packaged with each film pack, a main power switch is closed upon full insertion of the film pack to connect the battery with camera carried electric circuitry, and the film container defines the location and to some extent the format area of an image to be formed on the uppermost of successive film sheet assembly in the container. Each film sheet assembly in the system carries a supply of processing fluid in an amount calibrated to cover the image format area after exposure and passage of the sheet assembly between a motor driven processing roller pair supported in the camera. In particular, the processing fluid is spread across the interface between a pair of plastic sheets in each assembly, at least one of which plastic sheets is transparent for exposure of a light sensitive layer carried between the sheets and so that the resulting positive photographic image may be viewed.

Because of the construction of each film sheet assembly, its exterior appearance is that of a framed photograph in which four marginal edges are defined by paper or other similar material folded about these edges to secure the two plastic sheets in overlying coextensive relationship. The bottom marginal edge of the framed photograph is wide relative to the marginal side and top edges principally because it encloses the pod or supply of processing fluid carried by each film sheet assembly. Also, because of the construction of the sheet assemblies, the top wall of the container in which the film sheets are contained is provided with marginal lips dimensioned to substantially cover the framing margins of the photographic sheet including the bottom marginal edge in which the processing fluid pod is located.

In the operation of the system, the uppermost film sheet assembly in the container is exposed and then engaged at its rear edge (the top edge of the photograph) by a linearly driven pick and advanced through a slot in the front wall of the container for a distance calibrated to place the leading edge of the exposed film sheet (the bottom edge of the photograph) within the nip of the processing roller pair. The rollers then feed the exposed sheet assembly forwardly to first rupture the processing fluid pod, spread the processing fluid across the interface between the plastic sheets and finally discharge the exposed and processed sheet from the camera.

The outside dimensions of the presently available "Polaroid SX-70 Land Film" unit are approximately 89×108 mm to provide a substantially square image area approximately 79 mm on the side. The width of the framing margin at the bottom of the photograph is approximately 19 mm whereas the framing margin about the side and top edges of the photograph are approximately 5 mm. While the dimensions of the photograph are well suited for storage in albums or the like, versatility of such camera/film systems would be enhanced significantly by a capability of providing smaller format photographs, such as for example a 45 mm format to provide a "wallet size" photograph. The problems associated with adapting the existing system to such smaller format photographs entail not only one of positioning the smaller sized format film sheets properly within the existing film well of the camera but also an accomodation to the smaller format photograph of camera carried components such as the camera's battery contacts, the camera viewing system, the pick by which each film sheet is advanced from the container to the processing rollers, the power switch closed by full insertion of the film pack and the attainment of a smaller format photograph in which the marginally framed portions thereof, particularly the bottom marginal edge, may both contain a supply of processing fluid and be properly proportioned aesthetically to the reduced image area.

SUMMARY OF THE PRESENT INVENTION

In accordance with the present invention an existing instant camera designed to expose self-processing film sheet assemblies of a standard format size is adapted by a film pack insert for exposure of small format film sheet assemblies. The insert is incorporated directly in the container of a standard film pack so that functional coaction of the container exterior with the camera is unchanged. In order to provide for initial translation of an exposed film sheet assembly from the camera carried modified film pack to the pressure nip of a processing roller pair carried by the camera, the motion of a pick carried by the existing camera is transmitted to a relay pick carried by the modified film pack. To accommodate a proportional reduction of all dimensions of the smaller format film sheet assembly in the existing camera structure, and to accommodate a correspondingly increased distance of travel of the small format film sheet from the modified film pack to the pressure nip of the processing rollers, the movement of the relay pick may be amplified over that of camera pick movement. As an adjunct to use of the modified film pack, a viewfinder mask is provided to correlate the image seen in the viewfinder with the location and size of the smaller format film sheets.

Among the objects of the present invention are, therefore, the provision of a photographic system in which an existing camera is adapted to expose prepackaged film sheets of reduced format size; the provision of a modified film pack containing small format film sheet assemblies which may be accommodated by an existing camera structure in a manner to expose and process the film sheet assemblies in the modified film pack; the provision of an insert for standard film pack containers which enables the use of small format film sheet assemblies in which all dimensions are reduced substantially proportionally from that of a standard film sheet assembly for which the camera is designed; the provision of such an insert having a film sheet advancing pick movable through a distance equal to or in excess of that in which a camera carried pick is moved in the operation of the existing camera; and the provision of a viewfinder masking adjunct by which the existing camera viewfinder may be registered with a smaller image format.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENTS

Figure 1:
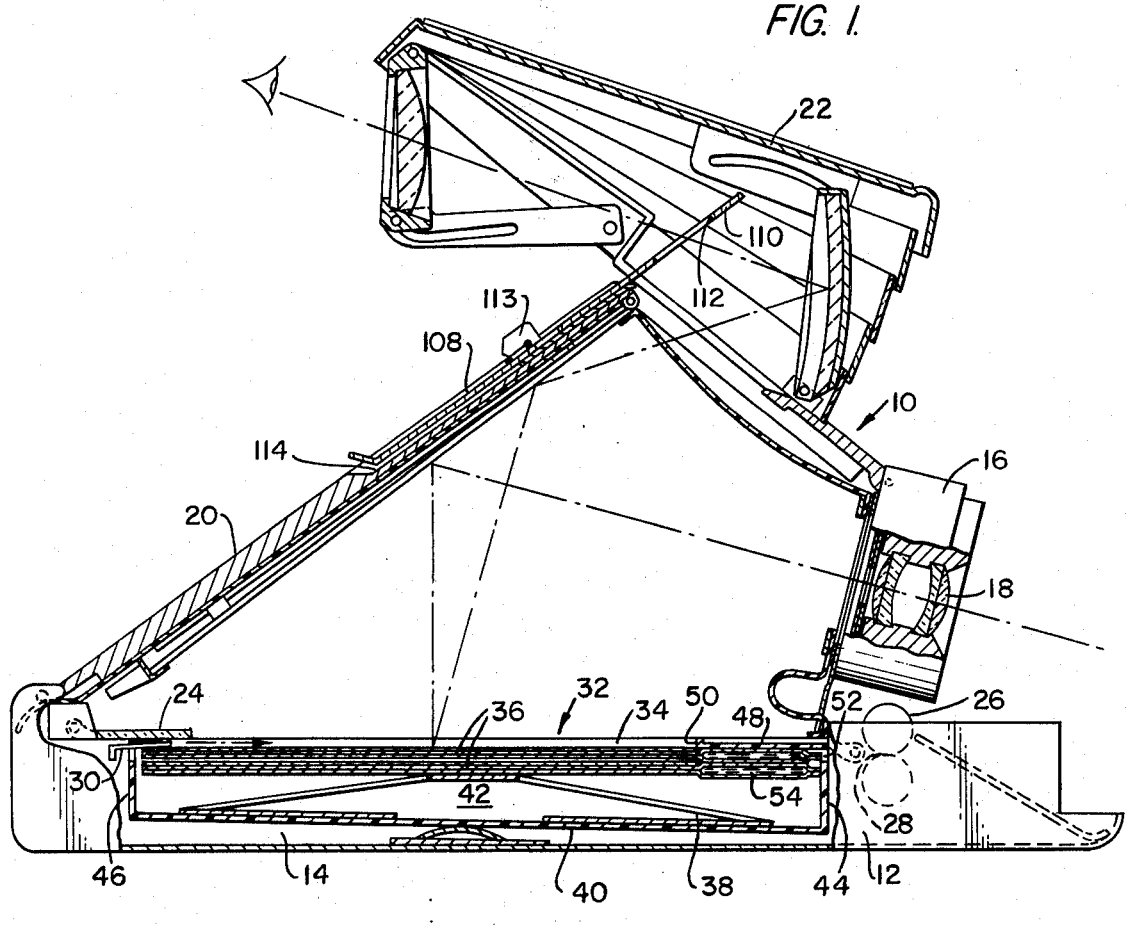
FIG. 1 is a longitudinal cross-section depicting operating components of a foldable single lens reflex camera in which the present invention may be used.

In FIG. 1 of the drawings, a foldable, single lens reflex camera 10 is shown to include a body 12 defining a film pack well 14, a shutter housing 16 supporting an objective lens 18, a foldable cover member 20 and a viewfinder 22. A reflex mirror 24 (only partially shown in FIG. 1) is pivotally supported by the body 12 for movement between a viewing position in which it overlies the well 14, and an exposure position in which it lies against the underside of the cover member 20. The camera 10, as thus constituted, is now well-known and available commercially under the trade designation "The Polaroid SX-70 Land Camera".

In addition to the components identified in the preceding paragraph, the camera includes as existing components, a processing roller pair 26 defining a pressure nip 28 and a linearly driven pick 30. In FIG. 1, the camera 10 is shown loaded with a conventional or standard film pack 32 defined by a container 34 which houses a plurality of overlying film sheet assemblies 36 biased upwardly by a leaf spring 38. As shown in FIG. 1 and also in FIG. 4 of the drawings, the container 34 includes a bottom wall 40, side walls 42, a front wall 44, a rear wall 46 and an upper marginal wall 48 defining a rectangular opening 50 through which the uppermost of the film sheet assemblies 36 may be exposed. The front wall 44 of the container is provided at its upper end with a slot 52 through which the uppermost film sheet assembly 36 may be advanced forwardly to the pressure nip 28 of the processing roller pair 26. As is well-known, the operation ruptures a processing fluid pod 54 contained in each film sheet assembly and spreads the processing fluid uniformly over the image format area of each sheet assembly 36. Also, the left rear corner of the back wall 46 is cut away, as in the upper marginal wall 48 in this region so that the pick 30 may engage the rear edge of the uppermost film sheet assembly 36 to advance this sheet assembly through the slot 52 until the leading edge of the assembly is engaged by the pressure nip 28. This cut out portion of the container 34 is designated by the reference numeral 55 in FIG. 4 of the drawings.

To facilitate an understanding of certain structural and operational features of the present invention which will be described more fully below, it will be noted by reference to FIG. 4 of the drawings that in the standard film container 34 heretofore used with the camera 10 to provide an image format area approximating the area of the opening 50, the front marginal portion of the top wall 48 extends from the wall 44 of the container 34, rearwardly by a distance A to the front edge of the opening 50. The distance A corresponds very closely to the width of the bottom margin of an existing "Polaroid SX-70 Land Film" photograph and is predicated primarily on the space requirements of the processing fluid pod 54 needed to accomodate the image format area of the existing film sheet assemblies. The optical system of the camera 10, including that of the viewfinder 22, is designed to register with the area represented by the opening 50 in terms both of size of the opening and the location thereof when the container 34 is properly and fully loaded in the well 14. Also in FIG. 4, the position of the processing rollers relative to the front of the standard film pack container 34 and the distance of camera pick feed to advance each standard film sheet assembly to the pressure nip 28 of the processing rollers is represented by the dimension X. In normal operation of the camera, therefore, the distance through which the pick 34 moves, or the throw of the pick 30, is at least that of the distance X.

Figure 5:
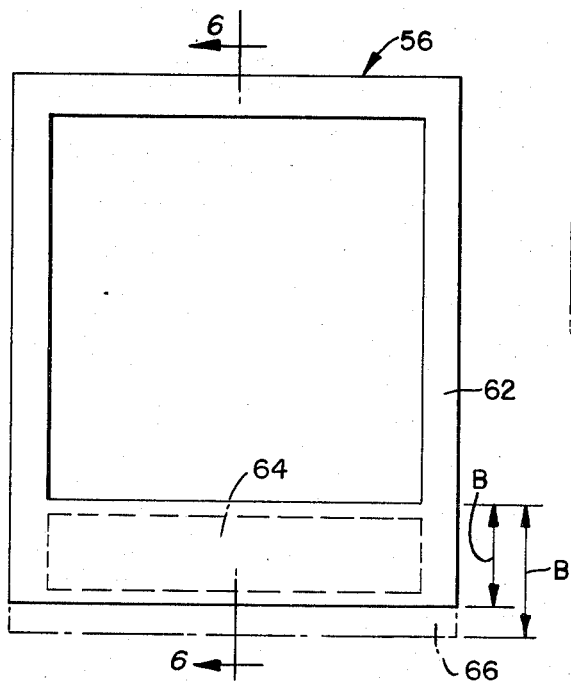
FIG. 5 is a plan view of a film sheet assembly having a reduced format size accommodated by the present invention.
Figure 6:
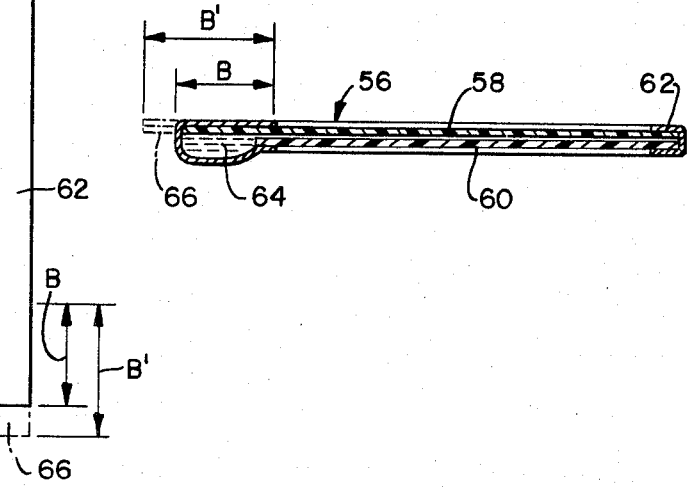
FIG. 6 is a cross-section on line 6—6 of FIG. 5.

In FIGS. 5 and 6 of the drawings, a reduced format film sheet assembly to be accommodated by the present invention is designated by the reference numeral 56. As may be seen in FIGS. 5 and 6, the construction of the sheet assembly 56, apart from size, may be identical to the conventional film sheet assembly and as such includes upper and lower plastic sheets 58 and 60, at least the upper sheet 58 being transparent, secured about their margins by the folded framing 62 of paper or other suitable material. A processing fluid pod 64 is provided in the lower framing margin. The film sheet assembly 56 illustrated in FIG. 5 is intended to represent a 45 mm square image format, a size consistent with "wallet-size" photographs.

Because of the reduced image format area of the film sheet assembly 56, the quantity of processing fluid needed for coverage of the effective image format area is less than that required in larger film sheet assemblies. Also for aesthetic reasons, it is desirable to confine the width of the frame margin needed to cover the processing pod 64 as small as possible. Thus, the preferred lower framing margin of the film sheet assembly 56 is represented by the distance B in FIG. 5. It is possible, however, that the lower framing margin of the film sheet assembly 56 be increased to the distance B' by adding to the lower margin of the film sheet 56 an extension 66 to make the lower margin equal to that of a conventional film sheet assembly. In other words, the margin is thus made equal to the distance A.

Figure 4:
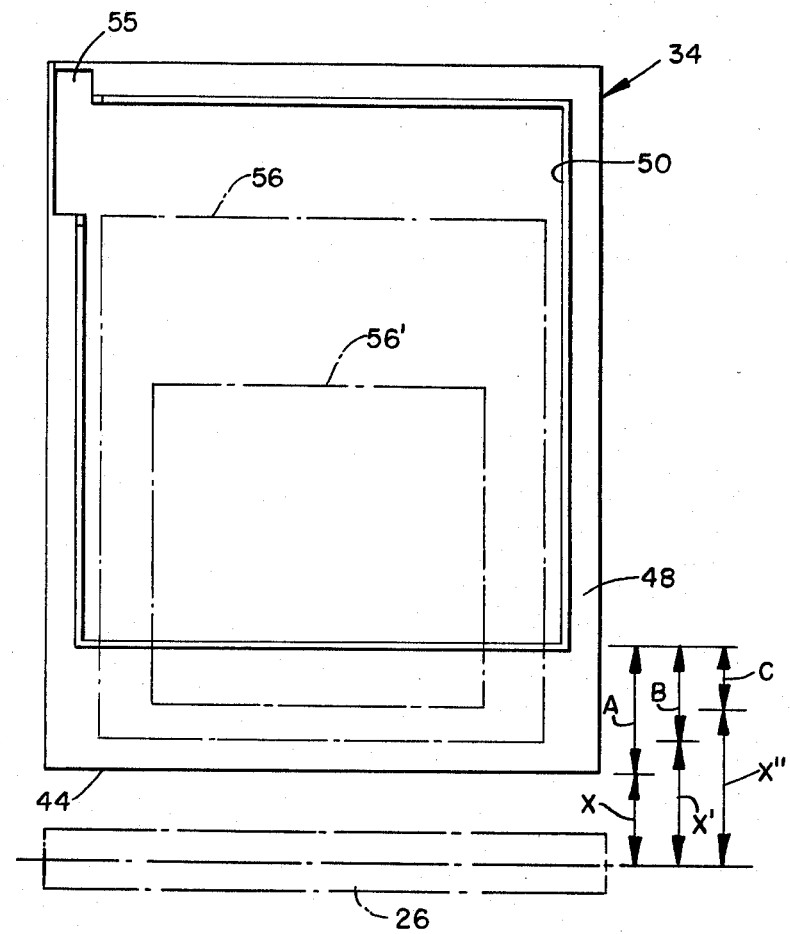
FIG. 4 is a plan view illustrating schematically the relative sizes and positioning of different format sizes of film sheet assemblies contemplated by the present invention for use in the camera illustrated in FIG. 1.

In FIG. 4 of the drawings, the reduced format film assembly 56 is shown relative to the opening 50 of the standard film pack container 34 for proper exposure in the camera 10. Where the bottom margin of the film sheet is equal to the distance B, pick feeding movement must be at least equal to the dimension X' in FIG. 4. The exterior periphery of an even smaller format film sheet assembly 56' is also shown in FIG. 4 as having a lower margin of the dimension C. Correspondingly, the pick feed movement required for the leading edge of the sheet 56' to reach the processing rollers 26 is equal at least to the dimension X". In each case, the fore and aft location of the image format area of the respective film sheet assemblies 56 and 56' are determined by the dimensions B, B' and C in reference to the front edge of the opening 50.

Figure 7:
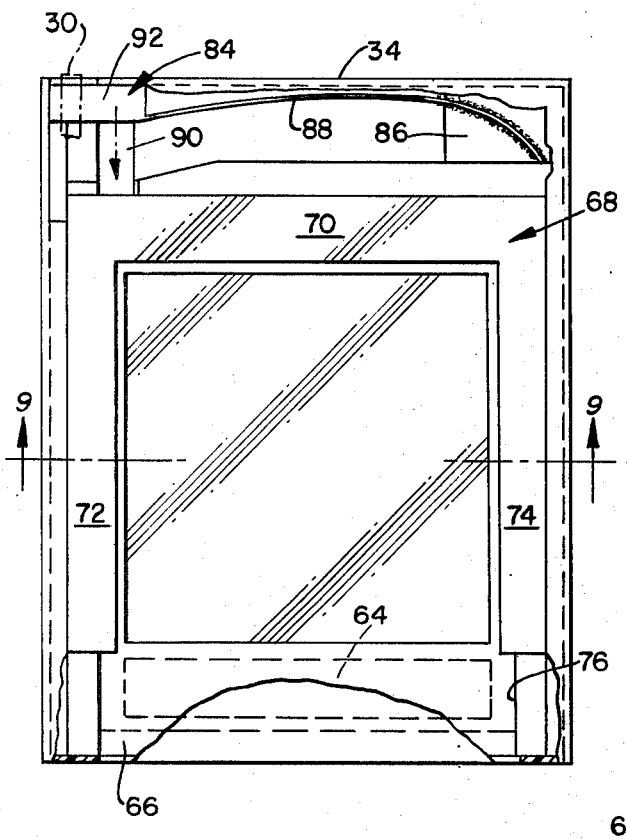
FIG. 7 is a plan view of one embodiment of the modified film pack of the present invention.
Figure 8:
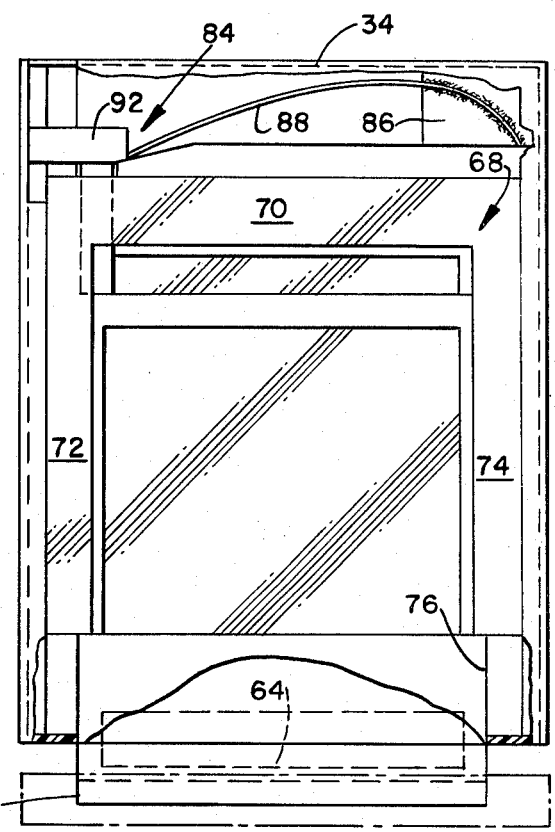
FIG. 8 is a plan view similar to FIG. 7 but showing illustrated components in a different operative position.
Figure 9:
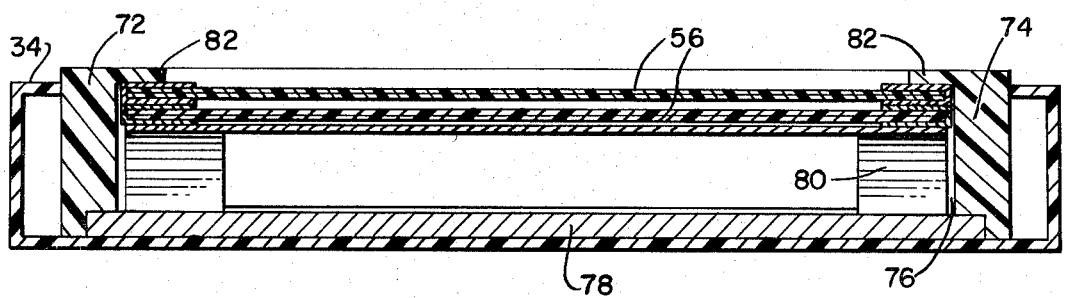
FIG. 9 is a cross-section on line 9—9 of FIG. 7.

In accordance with the present invention, the film sheet assembly 56 as well as others of reduced image format area are accommodated by an insert assembly 68 adapted to be fitted in the standard film pack container 34. As shown in FIGS. 7-9 of the drawings, the insert 68 is molded of plastic material and is of generally U-shaped configuration. Thus the insert 68 includes a base portion 70 and a pair of forwardly projecting leg portions 72 and 74 to establish a forwardly opening or three-sided recess 76 of a size to complement the film sheet assemblies 56. As in the conventional film pack, a sheet-like storage battery 78 is mounted in the bottom of the container 34 and a spring follower 80 of reduced size located vertically between the battery 78 and the lowermost of the film sheet assemblies 56 to be received in the recess 76. Each of the leg portions 72 and 74, as well as the base portion 70, is provided with inwardly extending marginal shoulders 82 against which the uppermost film sheet assembly 56 is biased by the spring follower 80.

Figure 10:
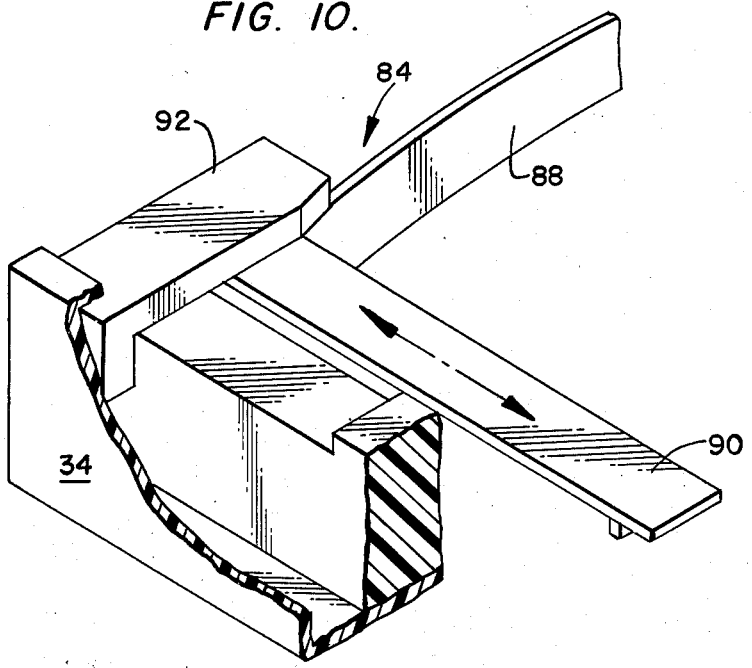
FIG. 10 is an enlarged fragmentary perspective view of a pick relay incorporated in the embodiment of FIG. 7.

In the embodiment of FIGS. 7-9, it is assumed that the film sheet assembly 56 is provided with the lower marginal extension 66 described above with respect to FIG. 6 of the drawings. By virtue of the extension 66, the distance of pick feed movement is the same as a conventional sheet or equal to the dimension X. In order to translate movement of the camera pick 30 to the reduced film sheet 56, however, a pick relay 84 is provided on the insert 68. In FIGS. 7 and 8, the insert 68 is shown to include a rearwardly extending bracket portion 86 to which a plastic leaf spring 88 is fixed, such as by fusion. A relay pick 90 projects forwardly from a block-like abutment portion 92 of the free end of the spring 88 to a position to be engaged by the camera pick 30. As shown most clearly in FIG. 10 of the drawings, the assembly of the spring 88, the block 92, as well as the pick 90, may be of integrally molded resilient plastic material. Forward movement of the camera pick 30 will, of course, engage the block-like portion 92 to advance the relay pick 90 against the uppermost film sheet assembly 56 in the modified film pack. Upon the return of the camera pick, the spring 88 will return the relay pick 90 to its original position.

Figure 11:
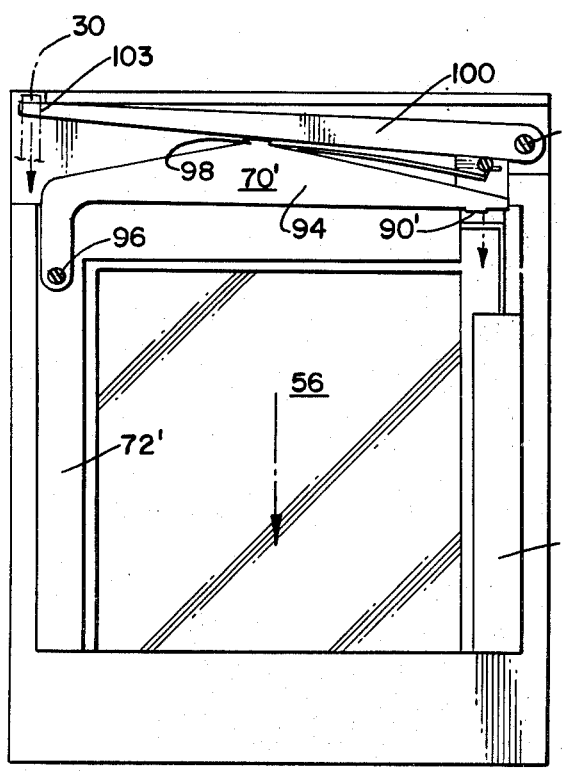
FIG. 11 is a plan view illustrating an alternative embodiment of the present invention.
Figure 12:
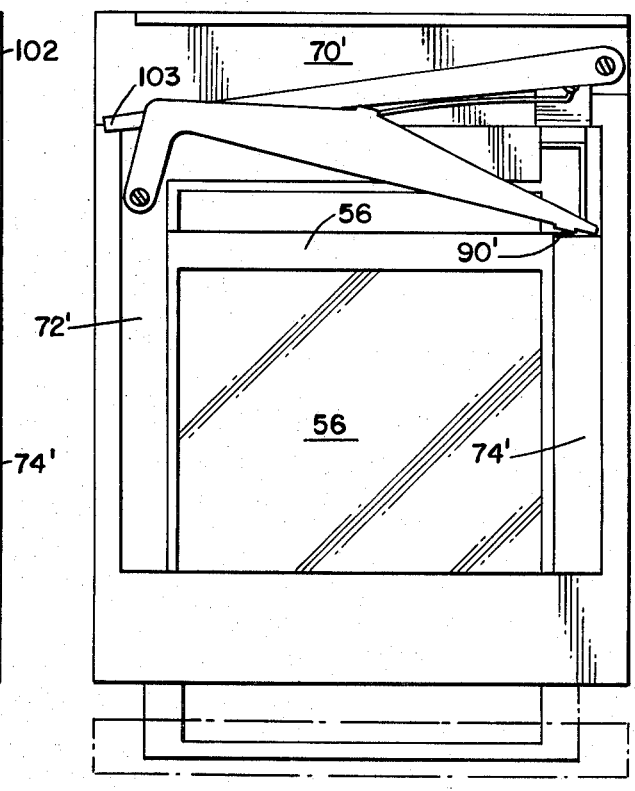
FIG. 12 is a plan view of the embodiment illustrated in FIG. 11 but with illustrated components shown in a different operating position.

In FIGS. 11 and 12 of the drawings, an alternative embodiment of the modified film pack is shown in which parts corresponding functionally to parts in the previously described embodiment of FIGS. 7-9 are designated by the same reference numerals but primed. As illustrated, the modified pack includes an insert 68' which is particularly, though not exclusively, adapted for use with film sheet assemblies in which the lower marginal edge is confined to the space requirements of the processing fluid pod 64 or to a width represented by the dimension B in FIGS. 4-6.

The principal difference between the embodiment of FIGS. 11 and 12 and the embodiment of FIGS. 7-9 lies in the actuating mechanism for the relay pick 90'. In particular, it will be noted that the pick 90' is supported near the end of a bell crank lever arm 94 pivoted from the leg 72' by a pintel 96. The arm 94 is formed with a fulcrum lug 98 adapted to be engaged by a second lever 100 pivoted by a pintel 102 aligned with the leg portion 74'. The free end 103 of te second lever 100 is positioned to be engaged by the camera pick 30 as shown. A cantilevered spring 104 engages the back of the fulcrum lug 98 so that the assembly of the two levers 94 and 100 will be biased to a retracted or rearward position.

As will be noted by a comparison of FIGS. 11 and 12, forward movement of the end 103 of the lever 100 by the camera pick 30 will effect pivotal movement of the bell crank lever arm 94 to move the relay pick 90' through a distance larger than the distance through which the camera pick 30 moves and by a distance dependent on the relative position of the pintel 96, the fulcrum lug 98 and the relay pick 90'. In other words, the position of the fulcrum lug 98 toward the pintel 96 from the center of the respective levers will result in increased amplification of movement of the relay pick 90'. By positioning the fulcrum lug toward the relay pick 90', a reduced amplification of relay pick movement can be effected. The alternative embodiment illustrated in FIGS. 11 and 12, therefore, offers the advantage of providing relay pick movement amplification as needed for the particular size of film sheet format necessary to advance each film sheet from the pack container to the processing roller pair of the camera 10.

Figure 2:
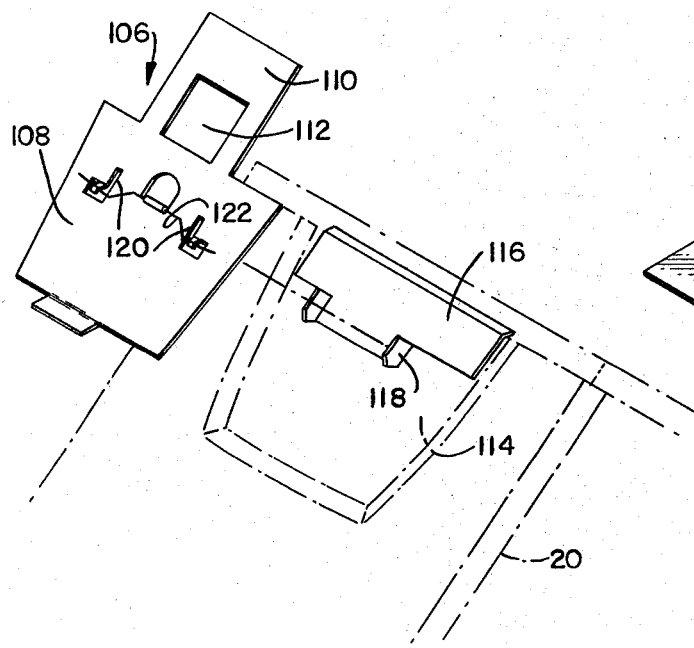
FIG. 2 is an exploded perspective view illustrating a viewfinder mask in accordance with the present invention.

To accommodate the relatively small format size of the film sheet assemblies 56, no modification of the exposure optics of the camera 10 need be made. To facilitate proper viewing of the image to be recorded on the reduced size film sheet 56, however, the camera viewfinder 22 must be modified. To this end, and as shown in FIGS. 1 and 2 of the drawings, a removable viewfinder mask 106 is provided as an adjunct to the film pack of the present invention. The mask 106 is in the form of a thin sheet of metal or other similar form sustaining opaque material and includes a generally trapezoidal mounting portion 108 from which a mask portion 110 extends. A window 112 corresponding in size to the reduced format size of the film sheet 56, taking into account the optical parameters of the viewfinder 22, is provided in the mask portion 110.

The trapezoidal configuration of the mounting portion 108 complements the shape of a viewfinder recess 114 provided in the cover member 20 of the existing camera 10. A mount 116 for the mask 102 is secured by pressure-sensitive adhesive, for example, to the upper edge of the cover. The mount 116 has a pair of projecting lugs 118 positioned so as not to interfere in any way with collapsibility of the viewfinder 22 and the camera 10. The lugs 118 extend through slots 120 in the trapezoidal body portion 108. The mask 106 is secured in place by a detent spring 122 engaging the lugs 118.

Figure 3:
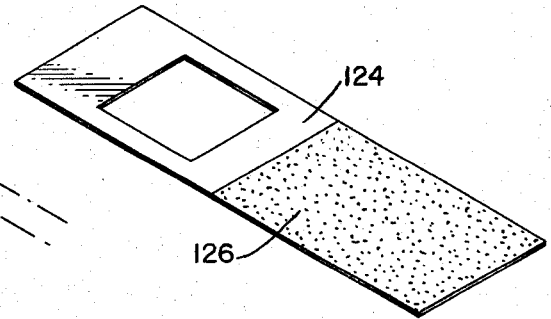
FIG. 3 is a modified embodiment of the viewfinder mask illustrated in FIG. 2.

An alternative embodiment of the mask 106 is shown in FIG. 3 and designated by the reference numeral 124. In this instance, the mask is a simple sheet of opaque material provided with an area of pressure-sensitive adhesive 126 to facilitate its being secured against the base of the viewfinder recess 114. By use of appropriate indicia (not shown), the mask may be positioned properly in the optical path of the viewfinder as shown in FIG. 1 of the drawings.

Thus it will be seen that as a result of the present invention, an unique film pack is provided by which the above-mentioned objectives are fully achieved. In the interest of clearly setting forth a practical application of the described embodiments, such embodiments have been correlated with the construction of the "Polaroid SX-70 Land Camera". It will be appreciated, however, that the invention has application to other specific types of instant cameras adapted to be used with film packs including a plurality of film sheet assemblies housed in a container. It is also contemplated that modifications and/or changes may be made in the embodiments described herein without departure from the inventive concepts manifested by these embodiments. It is expressly intended, therefore, that the foregoing description is illustrative only, not limiting, and that the true spirit and scope of the present invention be determined by reference to the appended claims.

What is claimed is:

1. In a self-processing photographic system including a camera normally intended to operate with a standard film pack of film sheet assemblies which are successively presented at a window in an upper marginal wall of a standard film pack container, the camera including means for defining a well to receive and position the standard film pack for exposure of each film sheet assembly through the container window, a processing roller pair defining a pressure nip through which each film sheet assembly is passed as it is withdrawn from the film pack and ejected, from the camera, and the camera including pick means of limited stroke for engaging each uppermost film sheet and for advancing each film sheet assembly from the film pack to the pressure nip of the processing roller pair, the improvement comprising:

a modified film pack having an exterior surface conformation to fit the camera well in the same manner as the standard film pack and an interior recess to receive one or more superimposed film sheet assemblies of a size smaller than the area of the standard film pack container window and to position said smaller sheet assemblies for exposure in the area of such window; and a relay pick device carried by said modified film pack for transmitting movement of the camera pick means to advancing movement of each one of the successive uppermost ones of said smaller sheet assemblies in said modified film pack responsive to successive strokes of the camera pick means, said relay pick being constructed so as to automatically return to an initial position prior to its next advancement by the pick means.

2. The system recited in claim 1, wherein said modified film pack includes a standard film pack container and an insert in said standard film pack container to define said recess.

3. The system recited in claims 1 or 2, wherein said relay pick comprises a leaf spring having a fixed end and a free end, an abutment block on said free end of said spring for engagement by the camera pick, said relay pick being mounted on said abutment block.

4. The system recited in claim 3, wherein at least said spring, said abutment block and said relay pick are defined by an integral molding of plastic material.

5. The system recited in claims 1 or 2, including amplifying means to increase the distance of relay pick movement over the distance of camera pick movement.

6. The system recited in claim 5, wherein said amplifying means comprises a pair of lever arms pivotally supported by said modified film pack, one of said lever arms having a free end to be engaged by the camera pick, the other of said arms having a free end supporting said relay pick, and fulcrum means for transmitting pivotal movement of said one arm to pivotal movement of said other arm.

7. The system recited in claim 6, including spring means having one end portion carried by said modified film pack and another end portion contacting one of said arms for returning said arms and said relay pick to the initial position.

8. A film pack for use in cameras having a well with interior surface conformation to receive and position a plurality of film sheet assemblies for successive exposure in the camera and ejection by a camera mounted pick, said film pack comprising:

a container having an exterior surface conformation to fit the camera well and an interior recess to receive one or more superimposed film sheet assemblies against the window defined by a wall of the container; and a relay pick device carried by the container for engagement by the camera pick and operative to advance each one of the successive uppermost smaller film sheet assemblies in said container responsive to successive strokes of the camera pick means in a direction generally parallel to the plane of said wall, said relay pick device being constructed to automatically return to an initial position prior to its next advancement by the camera pick.

9. The system recited in claim 8 wherein said pick relay includes means for amplifying movement thereof relative to movement of the camera pick.

10. A modified pack of self-processing film units for use in a camera normally intended to operate with a standard pack of self-processing film units, the standard pack having a given outside surface conformation and means for defining an exposure window of given size through which film units within the standard film pack may be exposed, the camera including means for defining a well to receive and position the standard film pack for exposure operations, a pair of opposed processing members defining therebetween a pressure nip through which each of the self-processing film units contained within the standard film pack is passed after its exposure to effect the processing thereof, a leading edge of each of the self-processing film units contained within the standard pack being spaced a given distance from the pressure nip of the processing members prior to its advancement into the nip, and pick means for engaging each film unit of the standard pack after its exposure and effecting the advancement of its leading edge into the pressure nip, said modified pack comprising:

a housing having an opening therein, an outside surface conformation substantially the same as the outside surface conformation of the standard pack so as to fit the camera's well in substantially the same manner as the standard pack and an interior recess for positioning a plurality of self-processing film units;

a plurality of self-processing film units disposed in a stacked array within said housing recess in alignment with its said opening to facilitate their sequential exposure through said opening, each of said film units of said modified film pack being substantially smaller in size than the film units of the standard film pack and presenting a substantially smaller photosensitive area than that of the film units of the standard film pack; and relay pick means carried by said housing for transmitting movement of the camera's pick means to each of said modified film pack's film units after its exposure in a manner causing the leading edge of the exposed said film units of said modified film pack to be advanced into the pressure nip of the camera's processing members, and for automatically returning to an initial position after each advancement by said camera pick means in readiness for movement of the next film unit.

11. The invention of claim 10 wherein said relay pick means is structured to displace the leading edges of said film units of said modified film pack substantially the same distance as the camera pick means displaces the leading edges of the standard film pack's film units.

12. The invention of claim 11 wherein said relay pick means is structured to amplify the movement of the camera pick means in that said relay pick means displaces the leading edges of said film units of said modified film pack a distance greater than the distance the camera's pick means displaces the leading edges of the standard film pack's film units.

13. The invention of claim 10 wherein said relay pick means includes spring means for automatically returning said relay pick to the initial position.

* * * * *